United States Patent [19]
Griffing et al.

[11] 3,858,071
[45] Dec. 31, 1974

[54] HIGH FREQUENCY, LOW INDUCTANCE GENERATOR

[75] Inventors: Brandt M. Griffing, Delray Beach, Fla.; Joseph A. Glockler, Jr., Kingston, N.Y.

[73] Assignee: International Business Machines Corporation, Armonk, N.Y.

[22] Filed: May 28, 1970

[21] Appl. No.: 41,434

[52] U.S. Cl. ............................................. 310/266
[51] Int. Cl. ............................................. H02k 1/22
[58] Field of Search ....... 310/178, 49, 67, 266, 166, 310/171, 159, 165, 36; 317/249

[56] References Cited
UNITED STATES PATENTS

| | | | |
|---|---|---|---|
| 3,089,044 | 5/1960 | Bolton | 310/36 |
| 3,209,187 | 9/1965 | Angele | 310/266 |
| 3,249,854 | 5/1966 | Nevius | 317/249 |
| 3,312,846 | 4/1967 | Henry-Baudot | 310/266 |
| 3,484,635 | 12/1969 | Mac Kallor | 310/67 |
| 3,490,672 | 1/1970 | Fisher | 310/266 |
| 3,521,099 | 7/1970 | Jewsiak | 310/178 |
| 3,602,749 | 8/1971 | Esters | 310/266 |
| 3,603,826 | 9/1971 | Saretzky | 310/266 |

OTHER PUBLICATIONS
Steinmetz Publication TK2181.57; Theory and Calculation Of Elect. Apparatus; 1st Edition, 1917; McGraw Hill Book Co. Inc.; New York, N.Y.

*Primary Examiner*—R. Skudy
*Attorney, Agent, or Firm*—G. E. Clark; George E. Clark

[57] ABSTRACT

A brushless dynamo-electric machine in which the armature is formed by a flat zigzag printed circuit winding and the rotating field pieces are energized by an annular field winding on the stator.

3 Claims, 1 Drawing Figure

PATENTED DEC 31 1974 3,858,071
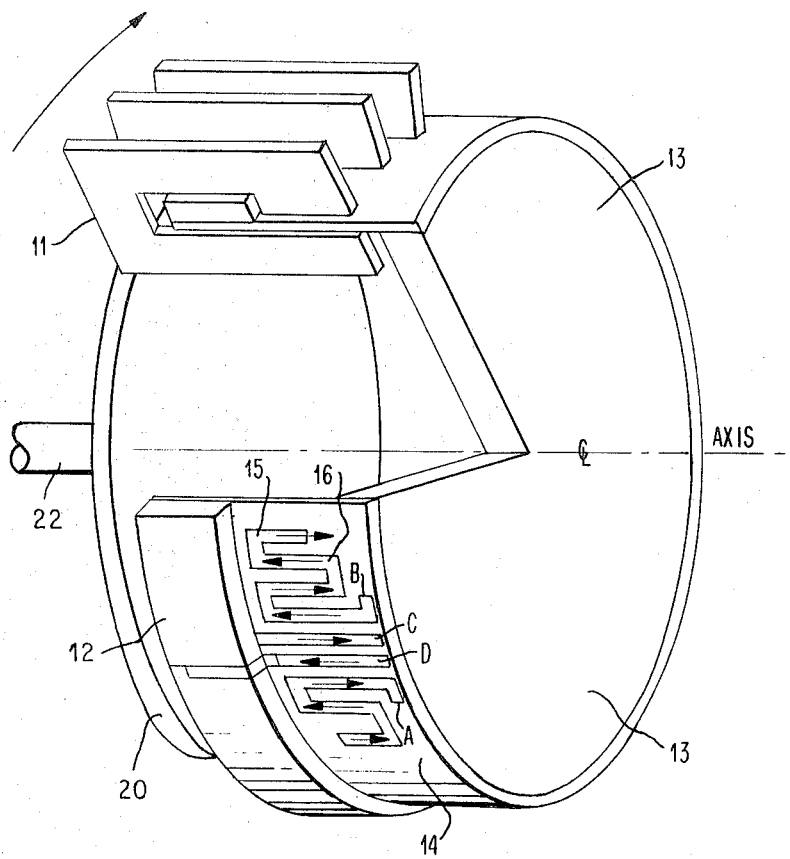
INVENTORS
JOSEPH A. GLOCKLER JR.
BRANDT M. GRIFFING
BY
AGENT

HIGH FREQUENCY, LOW INDUCTANCE GENERATOR

BACKGROUND OF THE INVENTION

The invention relates to dynamo electric machines, and more particularly, to a brushless alternator.

In the prior art, alternators required brushes to conduct current to and from the rotating member. This resulted in the requirement for inspection and replacement of brushes at periodic intervals.

Further, prior alternators, due to the nature of the rotating element, were incapable of producing high frequency current with low inductance.

Therefore, it is an object of the invention to generate high frequency electrical current from a device which exhibits a low inductance characteristic.

Another object is to generate high frequency current from a brushless machine.

A still further object is to generate high frequency current from an electrical machine in which the field excitation winding is contained on the stator while the field poles are contained on the rotor.

SUMMARY OF THE INVENTION

A high frequency, low inductance alternator is shown in which the rotating member supports a group of stamped metal pole pieces which are placed in an angular position around the periphery of the rotating member where the spacing is determined by the formula $S = 2\pi(\omega rpm)/60(f_{hz})$. The stamped pole pieces are excited by an annular field winding which is placed around the periphery of the stator member. The armature winding is a zigzag or serpentine printed circuit winding in which the spacing of the increments in the serpentine pattern is one-half the spacing of the stamped pole pieces so that two adjacent pole pieces at any given instant of time are inducing current in the same direction in alternate increments of the serpentine pattern.

The foregoing and other objects, features and advantages of the invention will be apparent from the following, more particular description of a preferred embodiment of the invention as illustrated in the accompanying drawing.

IN THE DRAWING

An isometric section view is shown of the high frequency, low inductance alternator showing the relative position and placement of the stamped pole pieces, the annular field winding and the serpentine armature printed circuit winding.

DETAILED DESCRIPTION

Referring now to the FIGURE, metal stampings 11, which may be steel, are carried on a rotating member 20 and driven by a prime mover 22 in a direction indicated by the arrow. Field winding 12 excites metal stampings 11 so that the metal stampings become field poles. Direct current is supplied to field winding 12 by printed circuit paths indicated at C and D.

Metal stampings 11 are constructed so that field winding 12 passes through a large cut out portion in the center of the stamping, while a smaller air gap is designed to pass over the armature 14. Armature 14 is mounted on stator support 13 and is constructed of a zigzag or serpentine printed circuit with alternate portions 15 and 16 carrying current in opposite directions.

Current is available at output terminals A and B, which represents ends of the zigzag winding 14.

The field magnetic circuit is formed by stampings 11 displaced radially around the axis of rotation with angular position of each of the stampings determined by the formula $S = 2\pi(\omega)/60(f)$ where:

S is angular displacement;
$\omega$ is angular velocity in revolutions per minute;
$f$ is frequency in hertz.

The spacing of like number increments 15 and 16 on the armature winding is equal to the spacing of the stampings 11 which form the field poles such that when any particular field pole is positioned over an increment, such as 15, all other field pole stampings are also positioned over increments 15, thereby inducing current flow in the same direction at the same time. In like manner, when the field pole stampings are positioned over the increments 16 at another instant of time, all field pole stampings are positioned over increments 16 around the perimeter of the stator.

OPERATION

Referring again to the FIGURE, at a first instant of time, with field pole stampings 11 excited by annular field winding 12, as stampings 11 pass segments 15, a current is induced in segments 15 such as shown by the arrows on the winding. For convention, it may be said that at this time, current is flowing in the positive direction at the peak of the cycle. During the period of time when the stampings are passing between segments 15 and segments 16, no current is induced in the windings.

This period of time represents the decay of current from the maximum positive value to zero in a cycle. During the period of time when pole pieces 11 pass segments 16, current is induced which results in an output current in a direction opposite to that induced when the pole pieces 11 pass over segments 15. This corresponds to a negative peak of the high frequency cycle.

By increasing the number of pole pieces and correspondingly, the number of adjacent segments 15 and 16 on the armature winding, it is seen that a higher frequency output signal can be generated. Likewise, if the number of adjacent field pole pieces 11 is decreased and the number of segments 15 and 16 are correspondingly decreased, the output frequency will be reduced.

For a given output frequency, it can be seen that the angular position of the pole pieces 11 is determined by the formula $S = 2\pi(\omega rpm)/60 (f_{hz})$;

where S is the angular position;
$\omega rpm$ is the rotational speed of the rotor in revolutions per minute; and
$f_{hz}$ is the desired output frequency in hertz.

Similarly, the angular position of the segments on the serpentine armature winding is determined by the formula $P = \pi(\omega rpm)/60 (f_{hz})$ where P is the angular position of the segments,
$\omega rpm$ and $f_{hz}$ are the same as above.

While the preferred embodiment described is in the form of a high frequency current generator, by reversing the energy flow, and applying a high frequency current to terminals A and B on the armature winding and a DC current to terminals C and D for field excitation, the invention also produces a brushless motor where rotational energy can be taken from the shaft driven by the rotor on which are mounted pole pieces 11.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A brushless, high frequency alternator comprising:

a rotor having a plurality of metal pole pieces mounted on and in spaced relation around the periphery of said rotor for rotation therewith;

a stator having an annular field winding mounted thereon and passing through a cut out portion of said metal pole pieces of said rotor for exciting said metal pole pieces;

said stator including a zigzag armature winding mounted thereto in an air gap formed by said metal pole pieces of said rotor.

2. A brushless, high frequency alternator as in claim 1 further comprising drive means connected to said rotor for driving said metal pole pieces to induce a high frequency current in said zigzag armature winding.

3. A brushless, high frequency alternator according to claim 1 further comprising electrical current input means connected to said zigzag armature winding for creating a magnetic field to drive said rotor to produce a mechanical output.

* * * * *

UNITED STATES PATENT AND TRADEMARK OFFICE
CERTIFICATE OF CORRECTION

PATENT NO. : 3,858,071
DATED : December 31, 1974
INVENTOR(S) : Brandt M. Griffing and Joseph A. Glocker, Jr.

It is certified that error appears in the above-identified patent and that said Letters Patent are hereby corrected as shown below:

Column 1, line 6, change "alternator" to --dynamo machine--.
Column 1, line 7, change "alternators" to --dynamo electrical machine--.
Column 1, line 11, change "alternators" to --dynamo electric machines--.
Column 3, line 10, change "alternator" to --dynamo electric machine--.
Column 4, line 6, change "alternator" to --dynamo electric machine--.
Column 4, line 10, change "alternator" to --dynamo electric machine--.

Signed and Sealed this twenty-seventh Day of April 1976

[SEAL]

Attest:

RUTH C. MASON
Attesting Officer

C. MARSHALL DANN
Commissioner of Patents and Trademarks